Jan. 12, 1971  J. A. WAGLE  3,554,667

TURBOMACHINE ROTOR

Filed Aug. 25, 1969  2 Sheets-Sheet 1

INVENTOR.
Joseph A. Wagle
BY Paul Fitzpatrick
ATTORNEY

Jan. 12, 1971  J. A. WAGLE  3,554,667
TURBOMACHINE ROTOR

Filed Aug. 25, 1969

INVENTOR.
Joseph A. Wagle
BY
Paul Fitzpatrick
ATTORNEY

United States Patent Office 3,554,667
Patented Jan. 12, 1971

3,554,667
TURBOMACHINE ROTOR
Joseph Albert Wagle, Indianapolis, Ind., assignor to General Motors Corporation, Detroit, Mich., a corporation of Delaware
Filed Aug. 25, 1969, Ser. No. 852,556
Int. Cl. F01d 5/32
U.S. Cl. 416—217                                   3 Claims

ABSTRACT OF THE DISCLOSURE

A turbomachine rotor includes blade carrying rings with axially spaced flanges having dovetail slots through the flanges to receive dovetail roots of each blade in the slots in each flange. A reinforcement ring of a fiber composite is disposed around the outside of the ring between the flanges. These reinforcement rings are spaced sufficiently from one side of the flanges abreast the slots to allow movement of the blade to free it from the slots. Fiber reinforced blade locking rings preventing axial displacement of the blades are mounted on the outer surface of the ring.

My invention relates to turbomachines and particularly to lightweight fiber reinforced rotors for machines such as compressors and turbines. The preferred embodiment of the invention is in a rotor for an axial flow compressor characterized by simple structure and light weight and having provision for ready removal of any blade in the event of wear or damage to the blade.

The principal objects of my invention are to provide an improved lightweight rotor structure, to provide a simple and economical rotor structure adapted to reinforcement by fiber composites, and to provide blade retaining means including fiber composite reinforced blade locking rings.

The nature of the invention and its advantages will be clear to those skilled in the art from the succeeding detailed description of the preferred embodiments of the invention and the accompanying drawings thereof.

It is well understood by those skilled in the art that turbomachines such as compressors and turbines ordinarily rotate at high speeds and that both the blades and the blade supporting structure such as a drum or disk are subject to very high stresses due to centrifugal forces. Because of the very high tensile strength of certain fibers such as those of boron or carbon, for example, it is possible to make a light rotor structure having a very high resistance to these centrifugal forces by the use of a fiber reinforced composite in the form of a ring which acts as a hoop to accept a large part of the tensile stress in the rim of the rotor.

My patent application Ser. No. 823,608 for Turbomachine Rotor, filed May 12, 1969, discloses a structure making use of the superior properties of fiber composites for strengthening a turbomachine rotor. The present invention is intended for similar applications but involves a simpler and less expensive structure which is suitable for some applications.

Figure 1:
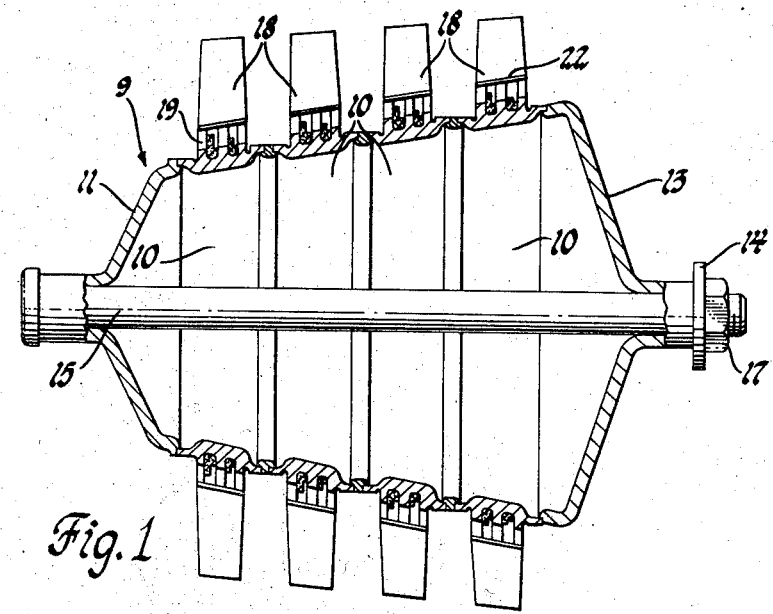
FIG. 1 is a sectional view of a drum rotor taken in a plane containing the axis thereof.

Referring now to the preferred embodiment of the invention, FIG. 1 shows a rotor for a four-stage axial flow compressor. The rotor comprises a drum 9 made up of four rings 10 and two end bells 11 and 13. As illustrated, the end bells are integral with stub shafts by which the drum may be mounted for rotation in suitable bearings, one stub shaft having a driving flange 14. The parts 10, 11, and 13 are held together by tie bolts 15 and nut 17. The end bells may have any suitable shape and the tie bolts may or may not be present, depending upon the particular design.

Figure 2:
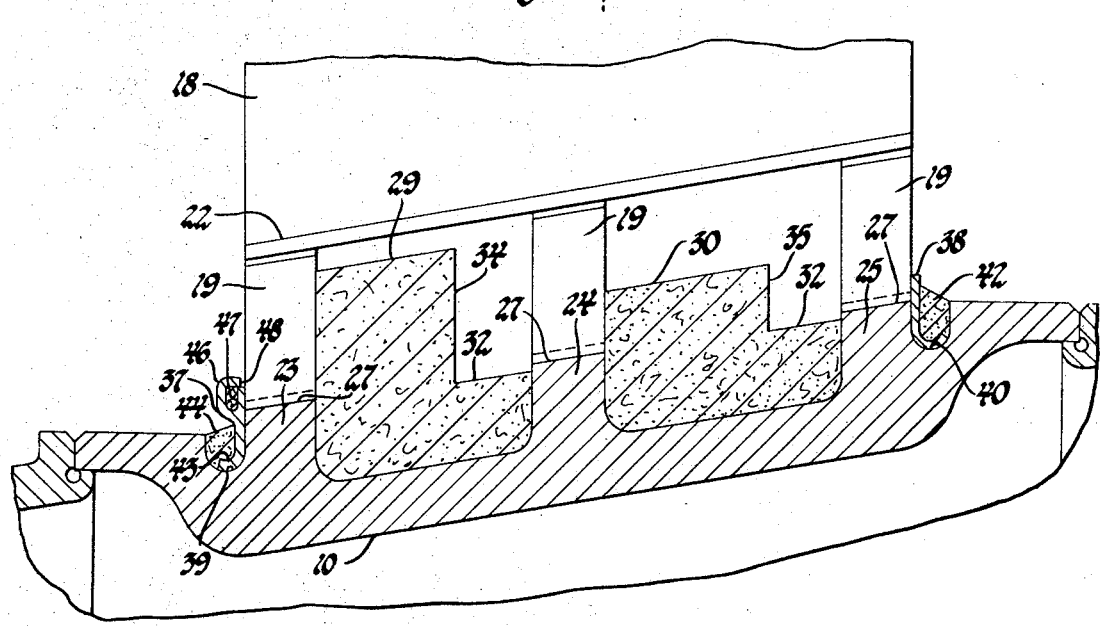
FIG. 2 is an enlarged view of a portion of FIG. 1.
Figure 3:
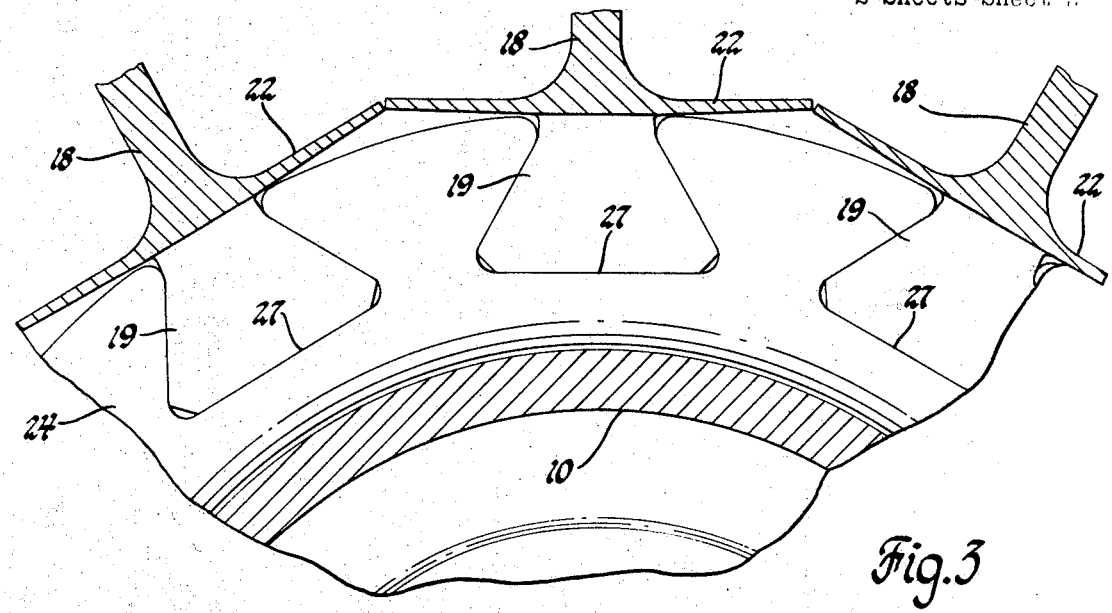
FIG. 3 is a cross sectional view taken on the plane indicated by the line 3—3 in FIG. 2.
Figure 4:
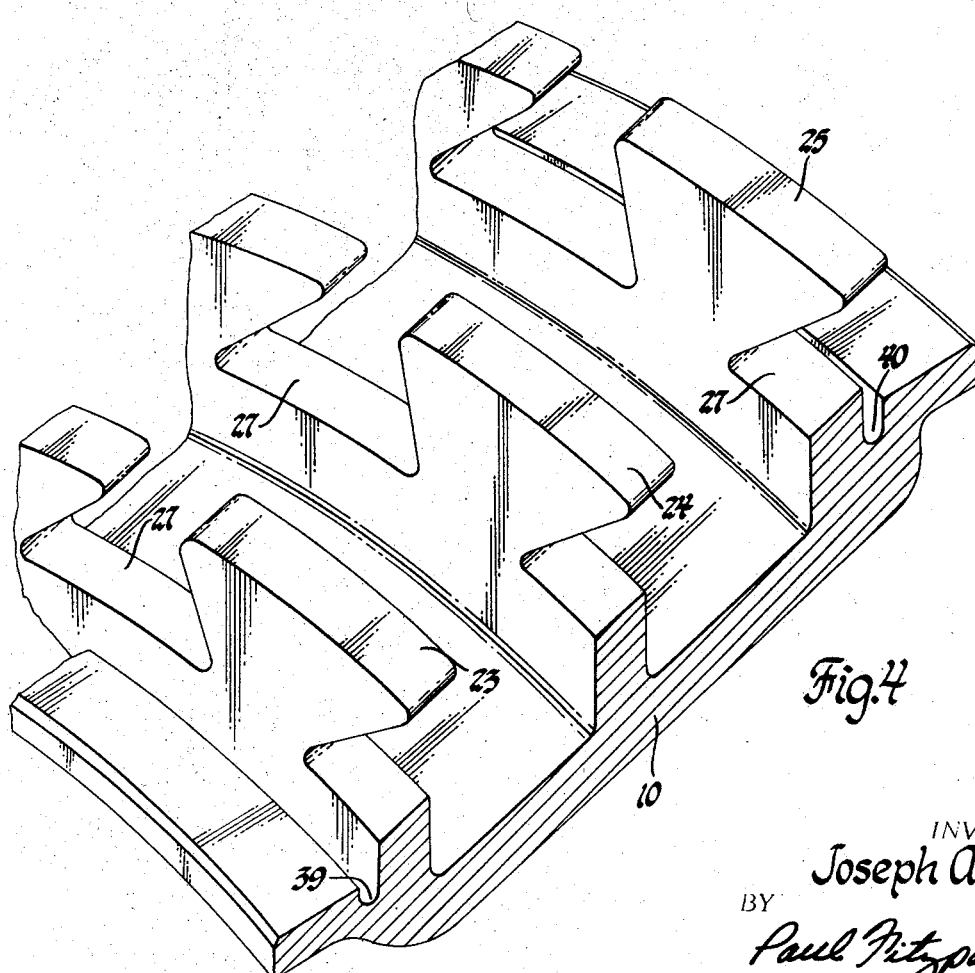
FIG. 4 is a fragmentary axonometric view of a blade supporting ring.

As shown, the rings 10 progressively increase in diameter, although they may not, and, generally, they are as near alike as feasible. Each ring mounts a row of blades 18 having roots 19. Each blade may embody a platform 22 between the airfoil portion and the root. Referring particularly to FIG. 2, the rings 10 are shown as in abutting piloting relationship. Each ring bears three axially spaced radially outwardly extending flanges identified as 23, 24, and 25, respectively, from the forward toward the rear face of the ring. The blade root 19 comprises three separate root portions of dovetail outline, as more clearly apparent in FIG. 3, which respectively engage in dovetail blade slots 27 cut into the flanges 23, 24, and 25. With this structure which per se is known in the prior art, any blade may be removed by moving it forward or backward a distance equal to the thickness of the flanges 23 to 25. It will be noted that the curvature of the periphery of the rotor is greatly exaggerated in FIG. 3.

The ring 10 is reinforced against the hoop stresses due to centrifugal force by two reinforcement rings 29 and 30 shown most clearly in FIG. 2. These are windings of high tensile fiber such as boron or carbon fibers impregnated with an epoxy resin which is cured to serve as a matrix for the fibers. The fibers may be wound onto the ring before the blades are attached. In order to provide space for removal of the blades, the rings 29 and 30 are of L-shaped cross section, the portion immediately ahead of flanges 24 and 25 being of less diameter than the forward portion as indicated at 32 providing a clearance between the front face of flange 24 and the surface 34 of ring 29 and between the front face of flange 25 and the rear surface 35 of ring 30 slightly greater than the thickness axially of the turbine of the flanges and of the blade root portions which are lodged in them. This configuration may be maintained by fitting a suitable ring over the lower layers of winding to confine the outer layers of winding as they are applied, which ring may thereafter be removed.

FIG. 2 also illustrates two forms of blade locking rings indicated at 37 and 38 respectively. These rings are lodged in circumferential grooves 39, immediately ahead of flange 23, and 40, immediately behind flange 25. As illustrated, the blade lock ring 38 is a lightweight sheet metal ring with an inner curved flange to fit the bottom of groove 40. The ring may be split so as to be applied into the groove 40 after which a winding of fiber 42 is applied and impregnated with an epoxy resin. Upon curing the resin, the lightweight ring 38, 40 is an effective stop against rearward motion of the blades and is of light weight. It may be cut to remove it.

In the structure shown, the reinforcement rings 29 and 30 would act to prevent rearward movement of the blades. However, in some situations, a ring at the rearward side of the blade roots might be desired, depending upon configurations.

Blade lock ring 37 at the forward face of ring 10 has a curved flange 43 which is overlaid by a fiber composite wrap 44 which urges the ring against the radial surface of flange 23 and also holds it against centrifugal stresses. Ring 37 has a further feature, a web 46 which extends forward and then outward generally parallel to the body of the ring to define a channel 47 within which a second fiber composite wrap is formed and cured. The outer edge 48 of web 46 may, if desired, be spun over the fiber composite material as shown. This also provides a strong lightweight fiber reinforced blade lock ring.

Successive blade supporting rings 10 may be held together by any desired means. They may be welded or splined or otherwise joined together for joint rotation.

Standoff rings to allow relative expansion between the blade supporting ring and the reinforcement rings may be provided if deemed desirable, as described in my abovementioned prior application.

It will be seen that the structure described provides a simple lightweight rotor structure. The metal parts preferably are of titanium alloy.

The detailed description of preferred embodiments of my invention for the purpose of explaining the principles thereof is not to be considered as limiting or restricting the invention, as many modifications may be made by the exercise of skill in the art.

I claim:

1. A turbomachine rotor comprising, in combination, a blade supporting ring, means mounting the ring for rotation about its axis, the ring including axially spaced flanges extending radially from its outer surface, circumferentially spaced dovetail blade mounting slots defined by the flanges, each blade mounting slot extending through a plural number of the flanges, blades having plural root dovetails engageable in the plural flanges and disengageable by relative axial movement of the blade and supporting ring, and a wrap reinforcement ring disposed around the supporting ring between adjacent flanges and bearing against the outer surface of the supporting ring, the reinforcement ring having an L-shaped cross section providing clearance between the reinforcement ring and the flange for axial disengaging movement of the blade root dovetails.

2. A rotor as recited in claim 1 in which the supporting ring has at least three flanges and a reinforcement flange is disposed between each two adjacent flanges.

3. A rotor as recited in claim 1 including a fiber composite wrap blade locking ring engaged in a circumferential groove in the outer surface of the supporting ring effective to lock the blade root dovetails against axial movement.

References Cited
UNITED STATES PATENTS

| | | | |
|---|---|---|---|
| 2,751,189 | 6/1956 | Ledwith | 416—217 |
| 3,332,500 | 7/1967 | Bristol et al. | 416—220(X) |
| 3,403,844 | 10/1968 | Stoffer | 416—230(X) |
| 3,494,539 | 2/1970 | Littleford | 416—220(X) |

EVERETTE A. POWELL, JR., Primary Examiner

U.S. Cl. X.R.

416—218, 221